United States Patent
McIntyre et al.

(10) Patent No.: US 6,299,809 B1
(45) Date of Patent: Oct. 9, 2001

(54) METHOD AND COMPOSITION FOR MAKING FOAMED POLYETHYLENE MATERIAL

(75) Inventors: William D. McIntyre, Oakland; Roderick R. Alire, Fremont; Ronald N. Clazie, Menlo Park, all of CA (US)

(73) Assignee: Free-Flow Packaging International, Inc., Redwood City, CA (US)

( * ) Notice: Subject to any disclaimer, the term of this patent is extended or adjusted under 35 U.S.C. 154(b) by 274 days.

(21) Appl. No.: 08/815,744

(22) Filed: Mar. 12, 1997

Related U.S. Application Data

(62) Division of application No. 08/546,025, filed on Oct. 20, 1995.

(51) Int. Cl.⁷ .................................................. C08J 9/00
(52) U.S. Cl. ............................... 264/51; 264/53; 264/145; 264/DIG. 5; 264/DIG. 15; 521/79; 521/82; 521/81; 521/142; 521/143
(58) Field of Search ................................ 264/145, 51, 53, 264/DIG. 5, DIG. 15; 621/79, 82, 98, 142, 143, 81

(56) References Cited

U.S. PATENT DOCUMENTS

| | | |
|---|---|---|
| 3,067,147 | 12/1962 | Rubens et al. . |
| 3,287,477 | 11/1966 | Vesilind . |
| 3,488,746 | 1/1970 | Gilbert . |
| 3,523,988 | 8/1970 | Roehr et al. . |
| 3,644,230 * | 2/1972 | Cronin .................................... 521/79 |
| 3,839,238 * | 10/1974 | Ealding ........................... 264/DIG. 5 |
| 3,972,970 | 8/1976 | Taylor . |
| 4,272,468 * | 6/1981 | Slocumb ................................ 264/53 |
| 4,412,961 * | 11/1983 | Di Biasi et al. ........................ 264/53 |
| 4,624,880 * | 11/1986 | Gouldling et al. .................... 428/143 |
| 4,640,933 | 2/1987 | Park . |
| 4,694,027 | 9/1987 | Park . |
| 5,089,533 | 2/1992 | Park . |
| 5,281,377 | 1/1994 | Iwano et al. . |
| 5,288,740 | 2/1994 | Park et al. . |
| 5,288,762 | 2/1994 | Park et al. . |
| 5,290,822 | 3/1994 | Rogers et al. . |
| 5,340,840 | 8/1994 | Park et al. . |
| 5,348,795 | 9/1994 | Park . |
| 5,348,984 | 9/1994 | Lee . |
| 5,369,136 | 11/1994 | Park et al. . |
| 5,405,883 | 4/1995 | Park . |
| 5,411,684 | 5/1995 | Tusim et al. . |
| 5,462,974 | 10/1995 | Lee . |
| 5,667,728 | 9/1997 | Lee . |

\* cited by examiner

Primary Examiner—Morton Foelak
(74) Attorney, Agent, or Firm—Flehr Hohbach Test Albritton & Herbert LLP

(57) ABSTRACT

Method and composition for making an expanded polyethylene material by forming a foamable melt of polyethylene, a nucleating agent, a material which retards migration of alkanes, and a blowing agent which comprises 10 to 100 mole percent ethane. In one disclosed embodiment, the melt is passed through an annular extrusion die to form an elongated tube of extruded material which is then expanded, slit lengthwise and laid flat to form a sheet of the expanded material.

16 Claims, No Drawings

METHOD AND COMPOSITION FOR MAKING FOAMED POLYETHYLENE MATERIAL

This is a division, of application Ser. No. 08/546,025 filed Oct. 20, 1995.

BACKGROUND

1. Field of Invention

This invention pertains generally to foamed polyolefin materials and, more particularly, to a method and composition for use in making a foamed polyethylene material.

2. Related Art

Foamed polyolefin materials are commonly prepared by melting an olefin polymer resin, mixing the heated resin with a blowing agent, extruding the mixture, and activating the blowing agent to expand the extruded product. One such process, which is concerned specifically with the manufacture of a foamed polyolefin sheet, is disclosed in U.S. Pat. No. 5,281,740.

The blowing agents heretofore used in the manufacture of foamed polyolefins have included n-butane, isobutane, chlorofluorocarbons (CFC's) and hydro-chlorofluorocarbons (HCFC's). CFC's and HCFC's can now be used only on a limited basis, however, because they deplete the earth's ozone layer. In addition, n-butane and isobutane are volatile organic compounds (VOC's) whose use is also limited because they produce smog.

Heretofore, there have been some attempts to use blowing agents other than the aforementioned in the manufacture of certain foamed products. U.S. Pat. No. 5,288,740, for example, discloses a process for making alkenyl aromatic foam packing bodies wherein carbon dioxide and/or ethane is used as a blowing agent. There is no suggestion in that patent, however, of using either carbon dioxide or ethane as a blowing agent for a foamed polyolefin.

U.S. Pat. No. 5,290,822 mentions the possibility of using ethane as a blowing agent in the manufacture of a thermoplastic polymer which consists of an olefin polymer in combination with polystyrene and an elastomer. However, the preferred blowing agent is said to be isobutane, and no details are given for using any of the other agents which are mentioned.

U.S. Pat. Nos. 4,640,933 and 4,694,027 relate to the manufacture of expanded polyolefin compositions with a blowing agent consisting of isobutane by itself or in combination with a chlorofluorocarbon or a fluorocarbon having from 1 to 5 carbon atoms and a boiling point between −50° C. and +50° C.

U.S. Pat. No. 3,067,147 discloses the production of polyethylene foam with 1,2-dichloro-tetrafluoroethane as a blowing agent. It suggests that other hydrocarbon blowing agents produce foams having non-uniform large cells.

U.S. Pat. No. 3,523,988 discloses a method of making large celled plastic materials with integral skins. It indicates that a wide variety of extrudable thermoplastic materials and blowing agents can be used in the process, including ethane. However, in the only specific examples actually given, the plastic material is polypropylene, and the blowing agent is nitrogen.

Another method of extruding a foamed plastic with an integral hardened sheath is disclosed in U.S. Pat. No. 3,972,970. Once again, a number of plastic materials and blowing agents are mentioned, including polyethylene and ethane, although no details are given for using the two together. Ethane is also included in a group of possible blowing agents for ethylenic polymer foams in U.S. Pat. Nos. 5,340,840 and 5,288,762, although there again no details are given for that combination.

U.S. Pat. No. 5,348,795 discloses a process for making a dimensionally stable, open cell polypropylene foam. It mentions the possibility of including small amounts non-propylenic polymers including polyethylenes in the mixture, and ethane is one of a number of possible blowing agents which are mentioned. No details are given, however, for the use of ethane in the process.

OBJECTS AND SUMMARY

It is in general an object of the invention to provide a new and improved method and composition for use in making a foamed polyethylene material.

Another object of the invention is to provide a method and composition of the above character which overcomes the limitations and disadvantages of the prior art.

Another object of the invention is to provide a method and composition of the above character which are particularly suitable for use in the manufacture of a foamed polyethylene sheet for use as a packing material.

These and other objects are achieved in accordance with the invention by forming a foamable melt of polyethylene, a nucleating agent, a material which retards migration of alkanes, and a blowing agent which comprises 10 to 100 mole percent ethane. In one disclosed embodiment, the melt is passed through an annular extrusion die to form an elongated tube of extruded material which is then expanded, slit lengthwise and laid flat to form a sheet of the expanded material.

DETAILED DESCRIPTION

In making a foamed polyethylene product in accordance with the invention, a solid polyethylene material such as low density polyethylene (LDPE) is melted by heating in an extruder. If desired, the polyethylene can be a blend which contains up to about 8 mole percent linear low density polyethylene (LLDPE). A nucleating agent such as Hydrocerol is added to the melt to control cell size, and a material such as glycerol monostearate is added to slow down the migration of alkanes. A blowing agent consisting of a combination of isobutane and ethane is introduced into the melt, and the melt is passed through a die and expanded.

The amount of nucleating agent added to the melt is on the order of 0 to 200 grams per 800 pounds of polyethylene, and the amount of glycerol monostearate is on the order of one to four percent by weight of the polyethylene.

The blowing agent contains 10 to 100 mole percent ethane, with 50 to 90 percent being the preferred range. Below 50 percent, the benefits of the ethane are reduced, and above 90 percent, the cells tend to rupture upon exit from the die, giving an open cell foam, particularly with thicker bodies of foam. The process is most suitable for producing foam sheets having a thickness on the order of 30 mils to 250 mils, although it can be used for sheets as thick as one-half inch or more.

EXAMPLE

A 3-½ inch diameter extruder and a 4-½ inch diameter extruder are operated in tandem at speeds of 78.8 and 23.4 rpm, respectively. Polyethylene is fed to the first extruder at a rate of 325 pounds per hour, and Hydrocerol nucleating agent is added to the polyethylene at a rate of 30 grams of the nucleating agent per 800 pounds of polyethylene. Glycerol monostearate is added at a rate of 9 pounds per hour, and ethane and isobutane are injected into the 3-½ inch extruder at rates of 22 pounds per hour and 18 pounds per hour, respectively.

The material exits the 4-½ inch extruder through a circular die at a rate of 74 feet per minute, foaming at the die. It is expanded by internal air pressure to form a tube having a diameter on the order of 24 inches, then slit lengthwise and laid flat to form a sheet having a width of approximately 75 inches. The sheet has a thickness of 125 mils and a density of 1.13 pounds per cubic foot.

The inclusion of ethane in the blowing has significant advantages. Without the ethane, the product described in the foregoing example would use 60 pounds of isobutane per hour and would have a density of 1.38 pounds per cubic foot. That would require more plastic, as well as more gas, which would significantly increase the cost of the product.

Another advantage of the ethane is that it migrates through polyethylene faster than other blowing agents such as butane. That reduces the time required for the gas to migrate out of the foam means that the foam can be shipped safely at an earlier date.

Ethane produces a greater volume of gas per pound than other blowing agents. That reduces not only the cost of the raw materials, but also the costs of transporting and handling those materials.

Like other blowing agents, ethane is blocked by materials such as glycerol monostearate. That prevents the foam from collapsing after extrusion and expansion. The use of ethane permits foams of lower density which are still stable.

While the invention has been described thus far with reference to the manufacture of a foamed polyethylene sheet, it is also believed to be applicable to other foamed polymers such as polyethylene copolymers, ionomers, and blends of such materials. It can also be used to make other foamed polyethylene products such as pipe insulation and gasket material.

If desired, the ethane can be blended with blowing agents other than isobutane, such as propane, CFC-11, CFC-12, HCFC-22, HCFC-122, HCFC-124, HFC-152a, HFC-143a, HFC-134a, HCFC-141b, HCFC-142b, n-butane, carbon dioxide, and nitrogen.

Similarly, nucleating agents other than Hydrocerol can be used as desired. Other suitable agents for this purpose include talc, sodium bicarbonate, citric acid, zinc oxide, antimony oxide, any other suitable fine powder, and combinations thereof.

Finally, materials such as glycerol monooleate, which have properties similar to glycerol monostearate in slowing down migration of alkanes, can be used in place of or in addition to the glycerol monostearate.

The invention has a number of important features and advantages. The ethane blowing agent has far less tendency than VOC's to form smog in the air and is consequently exempt from most emission control laws. It is substantially less expensive than other exempt gases such as halogenated blowing agents, and it can produce lower density foams than other blowing agents. With ethane, a greater volume of gas is created per pound of blowing agent than with other blowing agents, and that also serves to reduce the cost of the product. Curing times are reduced, and foam collapse is avoided since the ethane is blocked by the glycerol monostearate.

It is apparent from the foregoing that a new and improved method and composition for making a foamed polyethylene material have been provided. While only certain presently preferred embodiments have been described in detail, as will be apparent to those familiar with the art, certain changes and modifications can be made without departing from the scope of the invention as defined by the following claims.

What is claimed is:

1. In a method of making a foamed polyethylene sheet, the steps of:
    (a) forming a foamable melt consisting essentially of low density polyethylene, a nucleating agent in the amount of up to 200 grams of nucleating agent per 800 pounds of polyethylene, glycerol monostearate in an amount of about one to four percent by weight of the polyethylene, and a blowing agent consisting of about 50 to 95 mole percent ethane, and 5 to 50 mole percent isobutane,
    (b) passing the melt through an annular extrusion die to form an elongated tube of extruded material,
    (c) expanding the extruded material, and
    (d) slitting the tube in a lengthwise direction and unrolling the material to form a sheet of the expanded material.

2. The method of claim 1 wherein the ethane and the isobutane are introduced separately into the melt.

3. The method of claim 1 wherein the nucleating agent is added to the polyethylene in an amount of about 30 grams of nucleating agent per 800 pounds of polyethylene.

4. In a method of making a foamed polymer material, the steps of:
    (a) heating a polymer selected from the group consisting of polyethylene, polyethylene copolymers, ionomers, and combinations thereof,
    (b) forming a foamable melt by introducing into the heated polymer a blowing agent consisting of about 50 to 95 mole percent ethane, and 5 to 50 mole percent isobutane,
    (b) passing the melt through an extrusion die, and
    (c) expanding the extruded material.

5. The method of claim 4 including the step of adding a nucleating agent to the melt.

6. The method of claim 5 wherein the nucleating agent is added in an amount of up to 200 grams of nucleating agent per 800 pounds of polyethylene.

7. The method of claim 5 wherein the nucleating agent is selected from the group consisting of talc, Hydrocerol nucleating agent, sodium bicarbonate, citric acid, zinc oxide, antimony oxide, another fine powder, and combinations thereof.

8. The method of claim 4 including the step of adding to the melt a material which slows down migration of alkanes.

9. The method of claim 8 wherein the material is added in an amount of about one to four percent by weight of the polymer.

10. The method of claim 8 wherein the material added to the melt is selected from the group consisting of glycerol monostearate, glycerol monooleate, and combinations thereof.

11. In a method of making a foamed polymer material, the steps of:
    (a) heating a polymer selected from the group consisting of polyethylene, polyethylene copolymers, ionomers, and combinations thereof, and
    (b) introducing into the heated polymer a blowing agent consisting of ethane and isobutane, the ethane being present in the blowing agent in an amount of at least about 40 percent by weight based upon the total weight of the blowing agent.

12. The method of claim 11 wherein the ethane is present in an amount of at least about 50 percent by weight or more of the total blowing agent.

13. In a method of making a foamed polymer material, the steps of:
   (a) heating a polymer selected from the group consisting of polyethylene, polyethylene copolymers, ionomers, and combinations thereof,
   (b) forming a foamable melt by introducing into the heated polymer a blowing agent consisting of about 50 to 95 mole percent ethane, and 5 to 50 mole percent isobutane, and
   (c) expanding the foamable melt.

14. A process for producing an extruded, low density polyolefin foam product, said process comprising the steps of:
   (a) mixing a blowing agent with a plasticized polyolefin resin, the blowing agent consisting of ethane and a different alkane selected from the group consisting of $C_3$ and $C_4$ alkanes, the ethane being present in said resin in an amount of at least about 40 percent by weight based upon the total weight of the blowing agent; and
   (b) extruding the mixture of resin and blowing agent so as to produce a low density foamed polyolefin product.

15. The process of claim 14 wherein the ethane and alkane components of the blowing agent are added separately to the plasticized polyolefin resin.

16. The process of claim 14 wherein the blowing agent is mixed with the resin in the melting zone of an extruder at a temperature above the melting point of the resin.

* * * * *